C. TODD.
GARMENT PRESSING MACHINE.
APPLICATION FILED SEPT. 21, 1911.
1,038,686.
Patented Sept. 17, 1912.
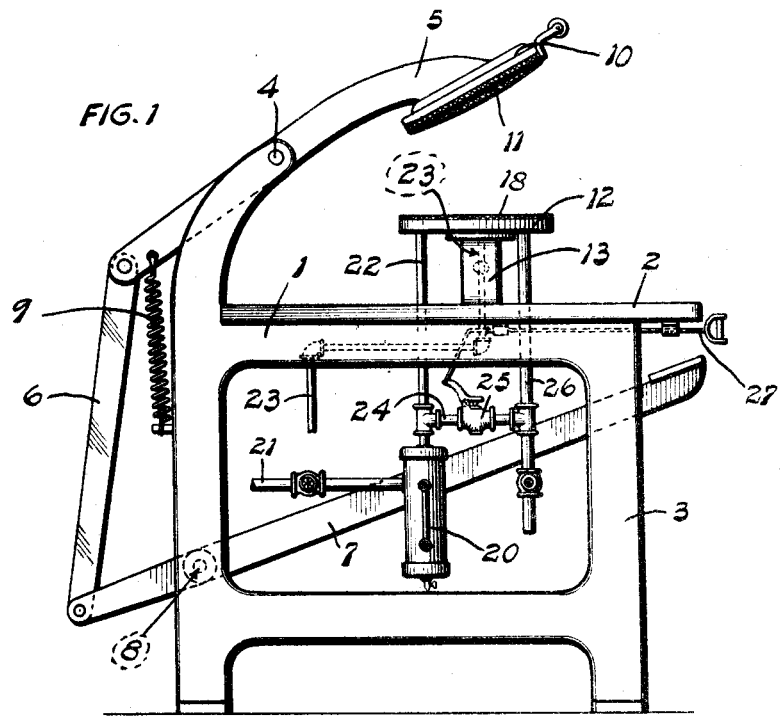
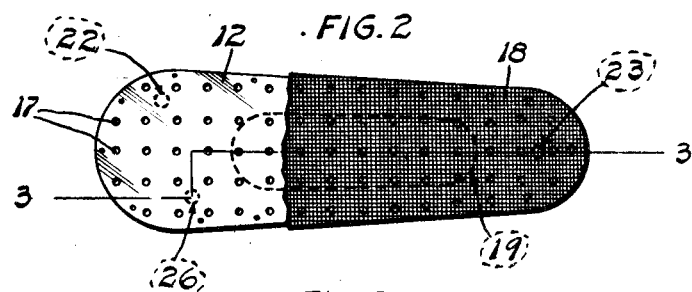
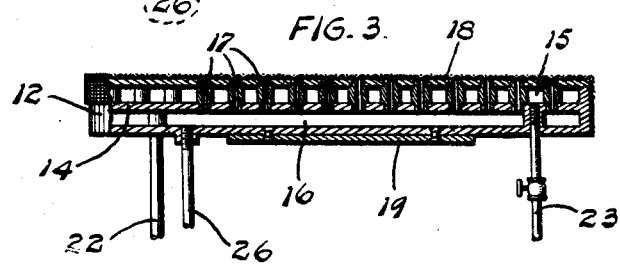
WITNESSES
INVENTOR
CHARLES TODD

UNITED STATES PATENT OFFICE.

CHARLES TODD, OF ST. LOUIS, MISSOURI.

GARMENT-PRESSING MACHINE.

1,038,686.   Specification of Letters Patent.   Patented Sept. 17, 1912.

Application filed September 21, 1911. Serial No. 650,656.

*To all whom it may concern:*

Be it known that I, CHARLES TODD, a citizen of the United States, residing at the city of St. Louis, State of Missouri, have invented a certain new and useful Improvement in Garment-Pressing Machines, of which the following is a specification, reference being had to the accompanying drawings, forming a part hereof, in which—

Figure 1 is a side elevational view of a garment pressing-machine embodying my invention; Fig. 2 is a top plan view of my new pressing bed, the cloth or other fabric covering thereof being partly torn away; and Fig. 3 is a longitudinal sectional view on the line 3—3, Fig. 2.

This invention relates to a certain new and useful improvement in pressing-machines particularly adapted for pressing garments, clothing, and the like, the objects of my invention being to provide a machine for steaming and pressing clothing and the like, which is comparatively simple in construction, which is capable of operation at small cost and with low pressure steam, and which is efficient in operation and capable of thoroughly steaming and pressing clothing and the like without shining, glossing, or steam-marking the same on the outer or service side thereof, and in which no means or source of heat, other than the steam supplied to the machine, is required to superheat the steam or heat the pressing surfaces, and to improve generally upon machines of the kind stated.

With these objects in view, my invention resides in the provision in a machine of the kind stated of a pressing-bed having an upper steam chamber normally in open communication with a source of steam supply and constantly steam heated for pressing purposes, a lower steam chamber separate from, and non-communicating with, said upper chamber, but communicating also with a source of steam supply, and a plurality of steam discharge ducts or outlets leading from said lower chamber up through said upper chamber to the outer upper or pressing surface of the bed, the steam admitted into said lower chamber spreading or expanding and diffusing its heat therein and passing therefrom through said outlets directly up, into, and through, and thereby steaming, the clothing being operated upon and, while passing through said outlets, being to a certain extent dried and reheated or superheated, as it might be said, by the steam in said upper chamber: in the provision in a machine of the kind stated of a padded pressing-head arranged above the pressing-bed and adapted to be maintained at proper pressing temperature by heat radiated from the pressing-bed and to coöperate with the pressing-bed and to press the clothing being operated upon without shining or glossing the same; and in the novel construction, arrangement, and combination of the several parts of my new pressing-machine, all as will hereinafter be described and afterward pointed out in the claims.

In the drawings, wherein like reference numerals refer to like parts throughout the several views, 1 indicates a suitable table or frame comprising a preferably wooden top 2 and suitable, preferably metallic, supporting-legs 3.

Pivotally mounted, as at 4, on table 1, is what might be called a goose-neck lever 5, which is pivotally connected by means of a link or rod 6 to, and adapted to be operated by means of, a lever 7 also pivotally mounted, as at 8, on said table or frame 1. These parts are of any ordinary or approved construction, lever 5 being preferably resiliently held or maintained in upper or inoperative position, or, in other words, in the position thereof shown in Fig. 1, by means of a coiled spring or the like 9 connected thereto and to table or frame 1 substantially as shown. Arranged on, and carried at its outer end by, said lever 5, is my new preferably wooden pressing-head 10 having preferably the shape of an ironing-board and provided on its under side with a preferably comparatively thick felt pad or other suitable preferably soft or sand padding 11, this head 10 being adapted, when said lever 5 is operated downwardly by means of said lever 7, to be brought down with sufficient pressing pressure upon, and to coöperate with, my new pressing-bed 12 arranged and mounted, as upon a suitable standard or other support 13, on the top 2 of table or frame 1 in coöperative relation to said padded pressing-head 10.

My new pressing-bed 12 comprises a hollow member having preferably a shape and size corresponding to that of pressing-head 10, divided by a partition 14 horizontally disposed therein into two distinct, separate, and non-communicating steam chambers— an upper chamber 15 and a lower chamber 16. Upper steam chamber 15 is substantially a closed chamber and is adapted to retain or hold, and be constantly heated by, the steam entering the same; and leading from said lower chamber 16, and extending up through said upper chamber 15 to the outer upper or pressing surface of bed 12 is a plurality of short tubular steam outlets or ducts 17 arranged preferably at short distances apart, as shown particularly in Fig. 2, so that, when the machine is in service or operation, steam will issue from a large number of outlets disposed at various points throughout the area of the outer upper or pressing surface of bed 12. To more thoroughly diffuse the steam emitted or discharged from said outlets or ducts 17, the upper and outer portion of pressing-bed 12 is preferably covered, as shown particularly in Figs. 2 and 3, with a suitable fabric covering 18. As my new pressing-bed 12 is preferably made of some suitable metallic material, such as brass, which will not easily corrode or rust, I preferably provide on the under side thereof a relatively heavy metallic plate 19, as shown particularly in Fig. 3, adapted to rest directly upon said support or standard 13.

20 indicates a suitable steam separator or trap communicating by means of a pipe 21 with a suitable source of steam supply; and communicating with said steam separator or trap 20 and leading directly therefrom into said upper chamber 15 is a normally open steam supply-pipe 22, through which said upper chamber 15 is adapted, while the machine is being used or normally, as it might be said, to be always filled with steam, whereby the upper or pressing surface of my new pressing-bed is, as it might further be said, constantly steam heated and maintained at proper pressing temperature, and it will be seen that the pressing-head 10, being arranged above, and being adapted to be brought down during the operation of the machine upon, said pressing-bed 12, will also be constantly maintained in a hot condition suitable for clothing pressing operations by heat radiated from the pressing-bed. As will be obvious, the water of condensation from the steam in chamber 15 may drain back into said separator or trap 20 through said pipe 22, or the same may find exit from said chamber 15 through a suitable air-vent 23 leading therefrom to any suitable place of discharge. Preferably suitably connected to, and communicating with, said steam supply-pipe 22 is a preferably horizontally-disposed short pipe 24 provided, as shown, with a suitable valve 25; and suitably connected to, and communicating with, said pipe 24 is a steam supply-pipe 26 leading into said lower chamber 16, as shown particularly in Fig. 3. This valve 25 normally cuts off communication between said lower chamber 16 and the source of steam supply and is adapted to be operated or opened to permit the passage of steam from pipe 22 into pipe 26 whenever desired preferably by means of a flexible connection 27 connected thereto and leading therefrom under said table top 2 to the front of said frame 1, as shown particularly in Fig. 1, in proper position to be readily grasped by the operator of the machine. When the machine is in use or operation, said upper chamber 15 is adapted, as hereinbefore stated, to be always filled with steam and thereby constantly maintained at proper pressing temperature; and the clothing to be operated upon will, as is usual, be placed upon the pressing-bed 12 with its service side, as distinguished from its inner side, presented outwardly. Now whenever said valve 25 is opened, live steam will be let into said lower chamber 16, where it spreads out or expands and diffuses its heat and then passes from said chamber upwardly through said outlets or ducts 17 directly into and through the clothing, thoroughly steaming the clothing and thus making or rendering easy the pressing thereof, and such steam being, while passing through said outlets, to a certain extent dried and reheated or super-heated, as it might be said, by the heat of the steam in said upper chamber 15, after which the padded pressing-head 10 is brought down, as is usual, with sufficient pressing pressure upon the clothing and the same thereby quickly, thoroughly, and neatly pressed.

In my machine, the pressing-bed 12 and also the pressing-head 10 being always at proper pressing temperature, it will be seen that clothing pressing operations may be quickly and thoroughly had. It will also be seen that in my machine I am enabled to use low pressure steam for steaming the clothing, and not only is the steam permitted to follow its natural tendency to rise, but is also, to a certain extent, dried or super-heated while passing through the pressing-bed; and that further, such steam being directed against the inner surface of the clothing being operated upon and the pressing-head being padded and soft, there is not only no danger or liability of the clothing becoming steam-marked on its service or outer side, but also no danger or liability of the clothing becoming shiny or glossed when the pressing-head 10 is brought down thereupon to press the same. It will also be noted that, the pressing-head being comparatively light in weight, only a small outlay of power is needed to bring the same down with sufficient pressure or force to properly press he clothing being operated upon, and that my new machine is in every way fully capable of carrying out the objects hereinbefore stated.

I am aware that minor changes in the construction, arrangement and combination of the several parts of my new pressing-machine may be made and substituted for those herein shown and described without in the least departing from the nature and principle of my invention.

Having thus described my invention, what I claim and desire to secure by Letters Patent is:

1. In a garment pressing machine, the combination with a frame, of a pressing-head pivotally mounted thereon, and a pressing-bed fixedly mounted upon said frame below and in operative position relatively to said pressing-head and having superimposed upper and lower non-communicating steam-chambers provided with separate steam inlet-openings and a plurality of steam discharge-ducts leading from said lower chamber upwardly through said upper chamber to the top surface of the pressing-bed; substantially as described.

2. In a garment-pressing machine, the combination with a frame, of a pressing-head pivotally mounted thereon, a source of steam supply, and a pressing-bed fixedly mounted upon said frame below and in operative position relatively to said pressing-head and having a substantially closed upper steam chamber normally in open connection with said source of steam supply and adapted to be always filled with steam and thereby constantly steam heated, a separate lower steam chamber normally in closed communication with said source of steam supply, and a plurality of steam discharge ducts leading upwardly from said lower chamber through said upper chamber to and opening upon the outer upper surface of the pressing-bed; substantially as described.

3. In a garment pressing machine, the combination with a frame, of a pressing-head pivotally mounted thereon, a source of steam supply, a pressing-bed fixedly mounted upon said frame below and in operative position relatively to said pressing-head and having a substantially closed upper steam chamber normally in open communication with said source of steam supply and adapted to be always filled with steam and thereby constantly steam heated, a separate lower steam chamber normally in closed communication with said source of steam supply, a plurality of steam discharge ducts leading upwardly from said lower chamber through said upper chamber to and opening upon the outer upper surface of the pressing-bed, and means adapted to open communication between said lower chamber and said source of steam supply and thereby permit the passage of steam from said source of steam supply into said lower chamber and therefrom through said steam discharge ducts to the upper outer pressing surface of the pressing-bed; substantially as described.

4. In a garment pressing machine; a fixed hollow pressing-bed provided interiorly with a horizontally-disposed partition dividing said bed into separate, independent, upper and lower steam chambers, and a plurality of steam discharge ducts leading from the lower chamber through the upper chamber to the top of the bed; substantially as described.

5. A fixed pressing bed for garment pressing machines comprising a substantially closed upper steam chamber provided with a steam inlet opening, a separate lower steam chamber provided with a separate steam inlet opening, and a plurality of steam discharge ducts leading from said lower chamber upwardly through said upper chamber to and opening upon the outer upper surface of said bed; substantially as described.

In testimony whereof, I have signed my name to this specification, in the presence of two subscribing witnesses.

CHARLES TODD.

Witnesses.
RUTH PETERSON,
GEORGE C. EICHBAUM.